Dec. 16, 1941.　　　　G. QUAYLE　　　　2,266,399
WHEELED JACK
Filed April 27, 1939　　　　4 Sheets-Sheet 1
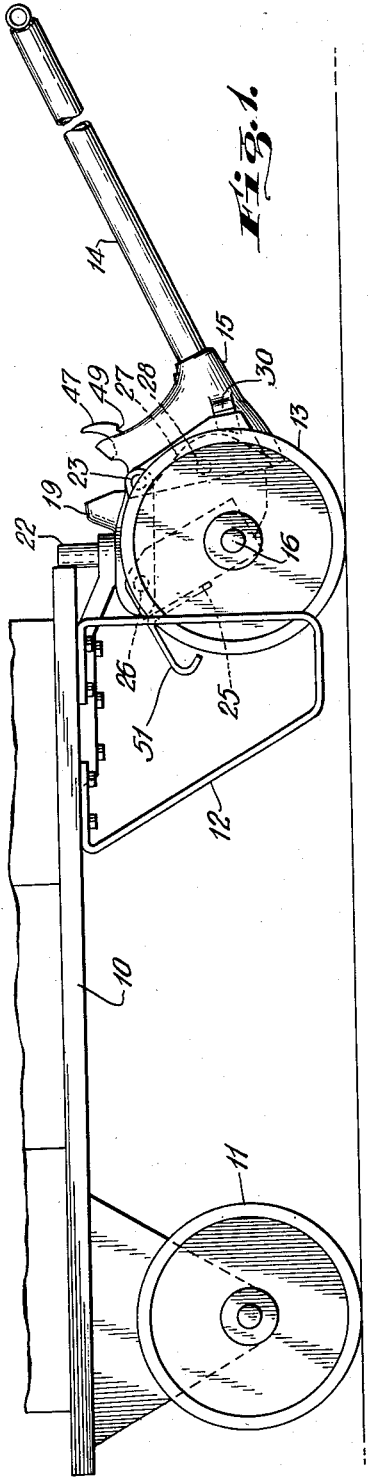
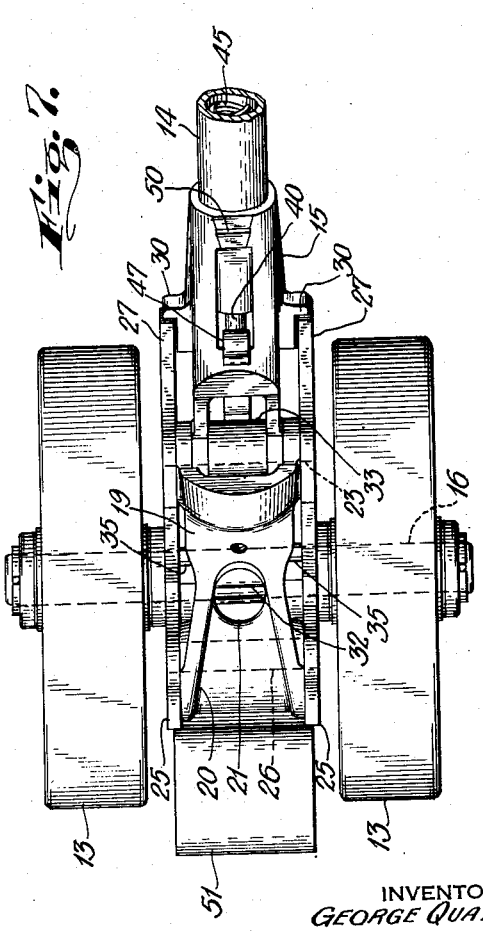
INVENTOR
GEORGE QUAYLE
BY
ATTORNEY Dec. 16, 1941.   G. QUAYLE   2,266,399
WHEELED JACK
Filed April 27, 1939   4 Sheets-Sheet 2
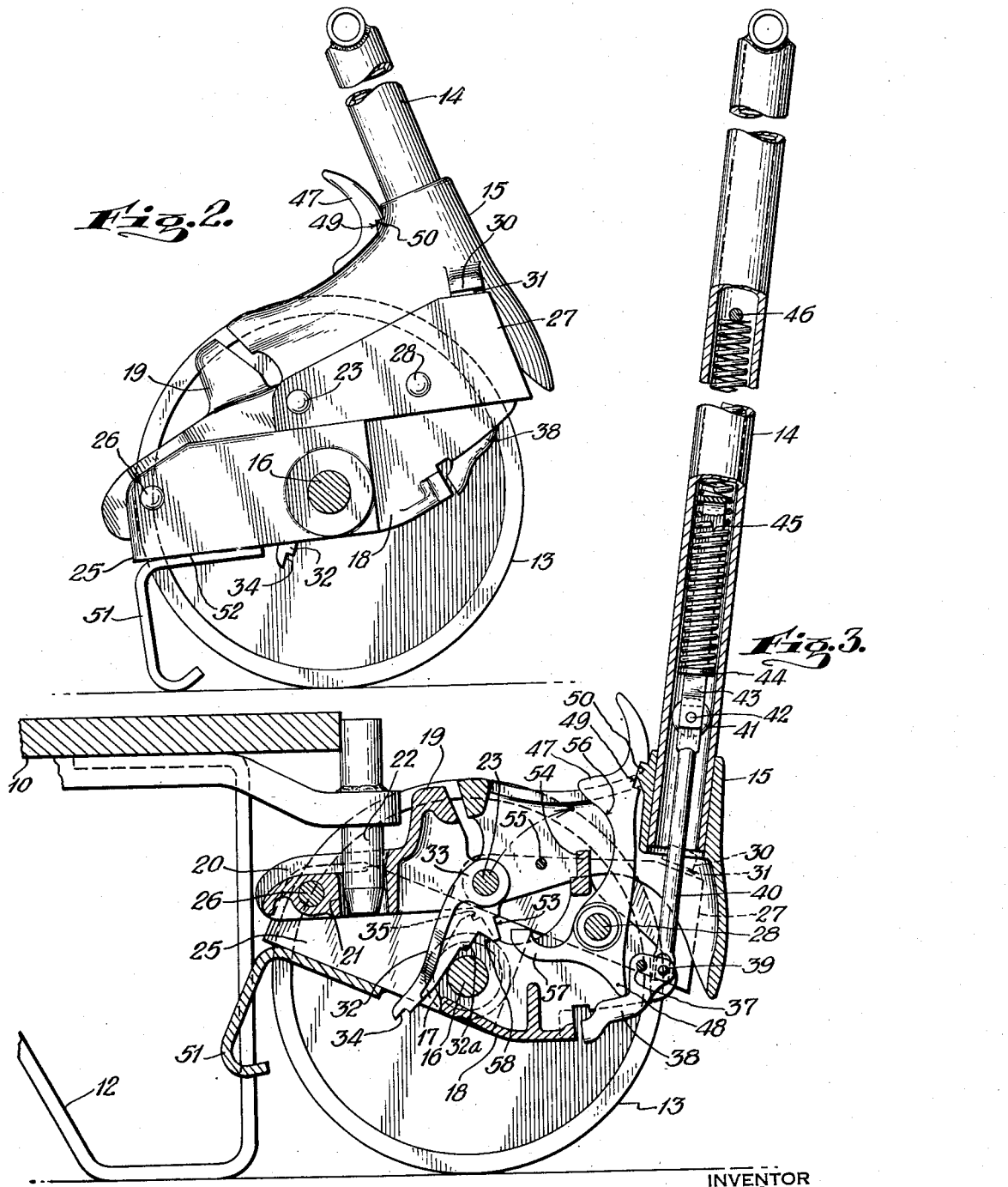
INVENTOR
GEORGE QUAYLE
BY
ATTORNEY

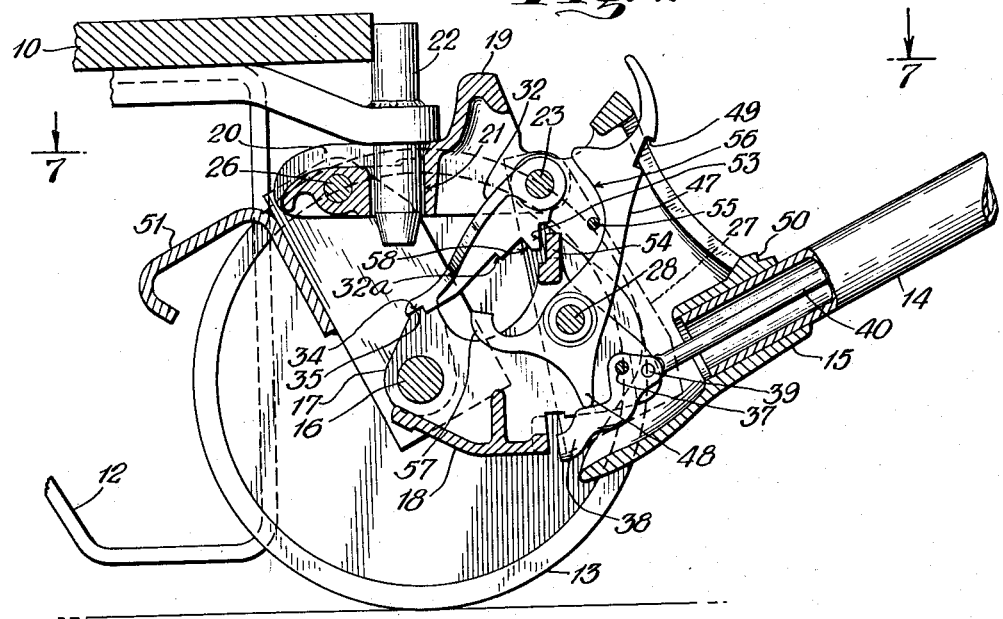
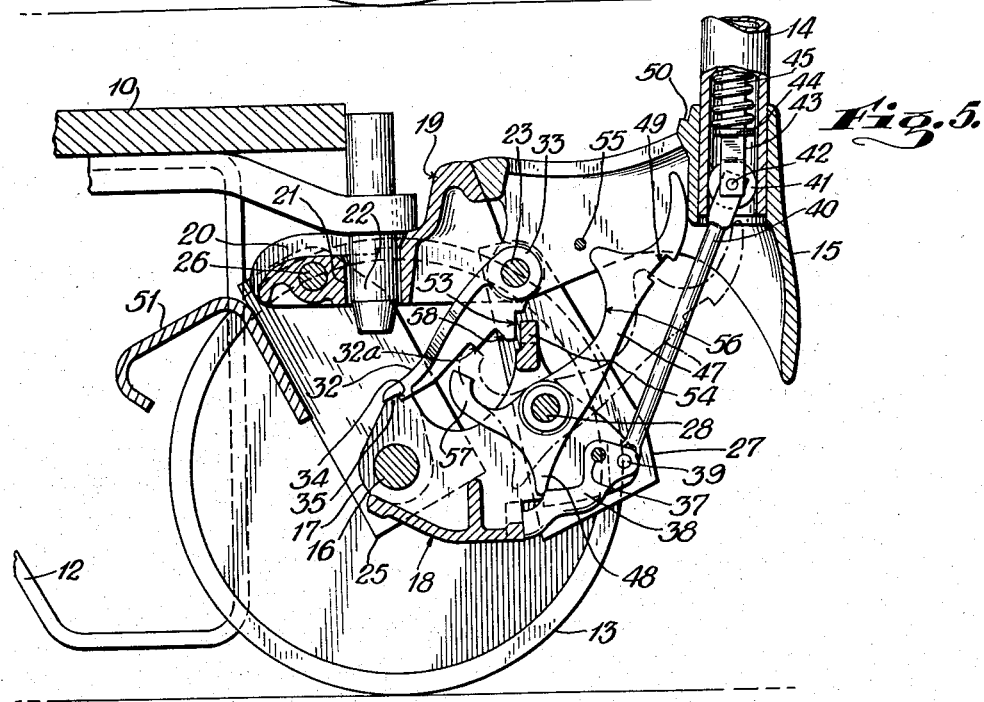

Dec. 16, 1941.                G. QUAYLE                    2,266,399
                              WHEELED JACK
                         Filed April 27, 1939          4 Sheets-Sheet 4
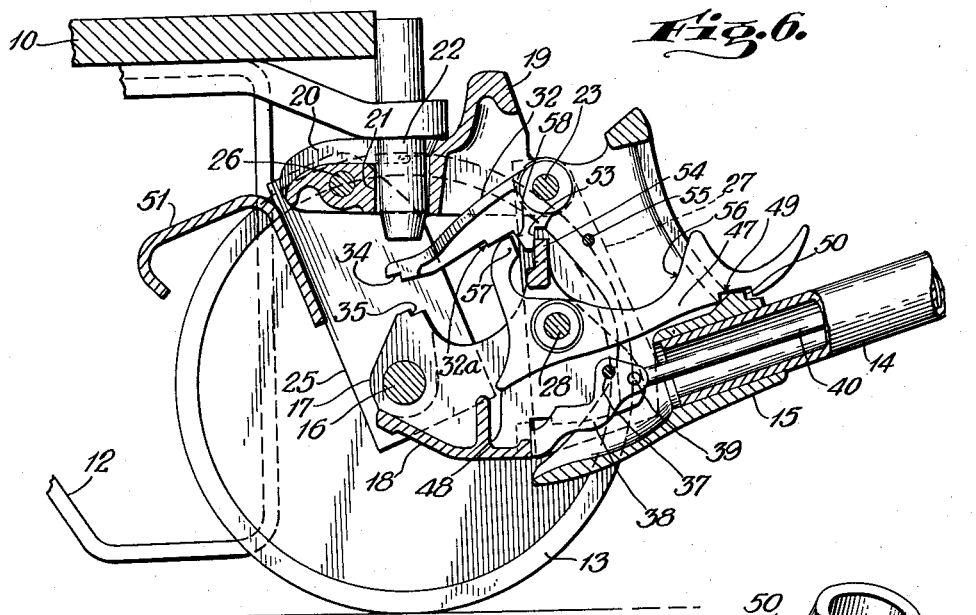
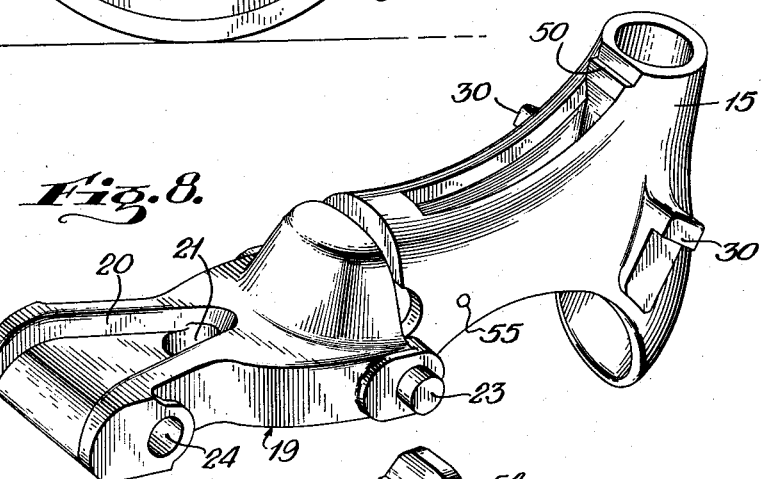
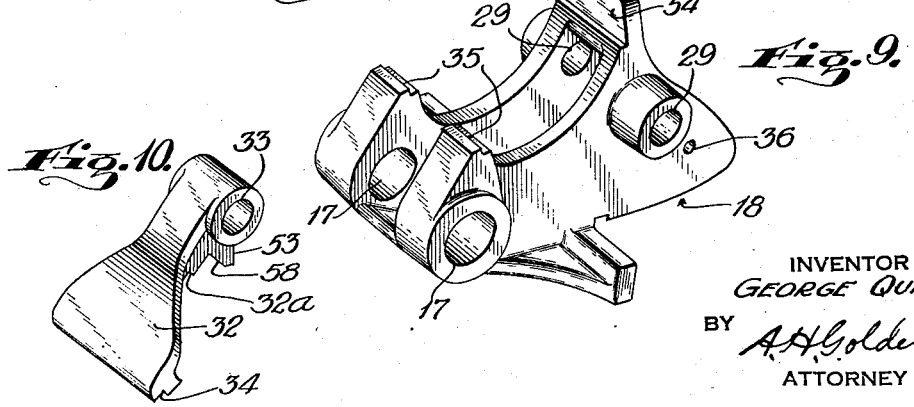
INVENTOR
GEORGE QUAYLE
BY A. H. Golden
ATTORNEY Patented Dec. 16, 1941

2,266,399

UNITED STATES PATENT OFFICE 2,266,399

WHEELED JACK

George Quayle, Philadelphia, Pa., assignor to The Yale & Towne Manufacturing Company, Stamford, Conn., a corporation of Connecticut Application April 27, 1939, Serial No. 270,316

28 Claims. (Cl. 280—46)

This invention relates to a type of wheeled jack adapted for cooperation with a semi-live skid platform, that is, a skid platform having two wheels at one end and two legs at its other end. By lifting that end of the skid platform which rests on the legs, off said legs and on to the wheels of the wheeled jack, the semi-live skid platform is converted into a full live skid platform. It might be said that the semi-live skid platform is converted into the equivalent of a four wheeled truck.

Prior art wheeled jacks having the same type of cooperation with semi-live skid platforms as above indicated, are well known in the art, and have been shown in numerous patents. However, in the prior art devices, it is customary to employ a freely pivoting trunnion forming a pin and socket connection with the semi-live skid platform. A main frame on which the trunnion is freely pivoted is adapted for rotation about a wheel supported axle carried by the wheels of the jack, and when rotated about this axle, elevates the trunnion and therefore the skid platform.

My wheeled jack differs from the prior art by employing a main frame which, during the lifting operation, has no substantial movement relatively to the wheel supported axle of the jack. The main frame of my jack supports through a pair of links a lifting frame which in turn engages, through a suitable connection, the semi-live skid platform.

This connection, which is preferably of the pin and socket type, is adapted to maintain the lifting frame against substantial tilting or rocking movement. Through the links connecting the main and lifting frames, it is therefore possible to hold the main frame against substantial movement, or against rocking or pivoting on the wheel supported axle, as has already been indicated. Because I employ a main frame of the type indicated, I obtain stability, safety, and ease of operation which is greatly desired in this art.

Moreover, because of the construction of my jack, it is possible to make connection quickly and readily between my jack and the semi-live skid platform. Similarly, it is possible to design the jack so that its over-all width is at a minimum, thereby giving greater stability in steering and in lifting.

In addition to the general advantages inherent in my invention, I employ a construction whereby it is necessary that the operator of the jack assume the full weight of the load on the skid platform before he may lower the skid platform off the jack and on to its legs. Thus, it is necessary to raise the load slightly beyond its normal elevated position in order to release a locking device which holds the lifting frame of the jack elevated. In this way, I prevent accidental release of the lifting mechanism and the consequent free swinging of the handle through the application of the load to the handle. Those skilled in the art fully appreciate the value of this feature, eliminating as it does the flying handle hazard.

As a further feature of the construction of my jack, I make it impossible to raise the load and then release the load at the end of the lifting operation by the mere continuance of the particular lifting operation. In this way, I eliminate the possibility of the load being released should the operator accidentally raise the load to the point at which is released the locking mechanism which normally locks the lifting frame of the wheeled jack in elevated position. In my jack, I require that the load be elevated by one operation of the lifting lever, and that the lifting handle or lever be then raised to a predetermined position in order to predispose the parts so that a subsequent assuming of the load at a predetermined position will allow for a release of the locking mechanism to permit the jack to lower the load. All this will be more apparent upon a reading of the specification.

In my wheeled jack, I employ a lifting handle or lifting lever, as it is sometimes called, which is spring balanced at all times so as to remain in a vertical position without any effort on the part of the operator. Moreover, the spring which balances the weight of the handle is used to hold the parts of my wheeled jack in proper operating relationship, all as will be indicated through a study of the specification which follows.

In addition to the features indicated above, other valuable constructions will be described in the specification and will be claimed. I consider my invention a distinct and valuable contribution to the prior art, and I do not wish to be limited in my monopoly to the specific structure I have shown, but rather wish to be protected in the enjoyment of my monopoly against the utilization of various other structures which may be devised by those skilled in the art embodying the principles of my invention.

For a description of the particular structure which I have devised to embody the principles of my invention, I shall now refer to the drawings wherein Fig. 1 shows my wheeled jack in load elevating position, and with the semi-live skid converted into a live skid, or a four wheeled truck. Fig. 2 is an elevation of my wheeled jack with one of the wheels removed, and the axle on which that wheel is supported shown in section. Fig. 3 is a section through my entire wheeled jack showing it just as it has engaged the pin of the skid platform, and prior to the application of any force to the lifting handle. Fig. 4 shows the parts of the wheeled jack shown in Fig. 3 just as the skid platform has been fully elevated and locked in its elevated position. Fig. 5 shows the parts of Fig. 4 when the handle has been moved back to a vertical position and the parts predisposed so that a subsequent assuming of the load by the handle will release the locking mechanism which is now in a position locking the load against lowering. Fig. 6 is a view of the parts of Fig. 5, but with the load assumed by the handle, and with the locking pawl now held out of locking position so that the skid platform may be lowered. Fig. 7 is a view looking down on the wheeled jack, and is taken substantially along lines 7—7 of Fig. 4. Fig. 8 is a perspective view of two of the parts forming my wheeled jack. Figs. 9 and 10 are perspective views of two other parts of my wheeled jack, the part in Fig. 9 being the main frame, while the part in Fig. 10 is the locking pawl.

Referring now more particularly to the drawings, and especially to Fig. 1, reference numeral 10 indicates a semi-live skid platform having wheels 11 at one end, and legs 12 at the other end. The wheeled jack of my invention comprises a pair of wheels 13 and a lifting handle or lever 14 extending from what I term a lifting member 15.

Referring now more particularly to Figs. 2, 3 and 8-10, I shall describe more in detail the parts of my wheeled jack. Supported by the pair of wheels 13 is an axle 16, this axle traversing the bearings 17 of a main frame member 18, shown in perspective in Fig. 9. The actual load contacting device, or lifting frame, as I shall term it, is designated by reference numeral 19, and is equipped with an angular guide groove 20 and a socket 21. The angular guide groove 20 cooperates, of course, with the pin 22 depending from the front end of the skid platform so as to guide the jack relatively to the pin 22 until the pin is brought into the socket 21, as is best seen in Fig. 3.

The lifting frame 19 carries a shaft 23 at one end, and has bearing openings 24 at its opposite end. A pair of front lifting links designated by reference numeral 25, are equipped at one end with bearing openings for mounting about the axle 16. Thus, the links 25 are really pivotally mounted relatively to the front end of the main frame 18. The other ends of each of the links 25 are pivoted to the lifting frame 19 through a shaft 26 traversing the bearings 24 of the lifting frame.

Rear links 27 are pivotally connected to the lifting frame 19 through the shaft 23 at one end. At the other end, the rear lifting links 27 are pivotally connected to the main frame 18 through a shaft 28 traversing bearing openings in the links 27 and bearing portions 29 in the main frame 18. It is thus seen that, in effect, I have a main frame 18, a lifting frame 19, and lifting links 25 and 27 connecting the front ends of the main and lifting frames and the rear ends of the main and lifting frames.

As was indicated with reference to Fig. 1, my lifting handle or lever 14 is secured in a suitable manner within a bore in the lifting member 15. This lifting member 15 is pivotally supported on the shaft 23. A pair of lugs 30 are cast integrally with the lifting member 15 and are adapted to cooperate with the links 27, as will be indicated later.

It will be well to note in Figs. 2 and 3, that in the normal position of the jack, the lifting handle and member 15 are held in such relation to the rear links 27 that a space 31 is maintained between the lugs 30 of lifting member 15 and the cooperating surfaces of links 27. This relationship of the lifting member 15 and the links 27 is maintained until such time as the load is assumed by the lifting frame 19 of the wheeled jack through the application of lifting pressure on the handle 14. Reference will be made later to this feature of my construction.

A locking pawl designated by reference numeral 32 is equipped with a sleeve portion 33 through which it is pivotally supported on the shaft 23, which it will be recalled is the same shaft which supports pivotally the lifting member 15 and the upper ends of links 27. This holding pawl 32 has a detent portion 34 which is adapted to cooperate with a holding lug 35 formed on the main frame 18, to hold the lifting frame 19 in elevated position relatively to the main frame, as will be described presently. Other features of the locking pawl 32 will be described later in connection with other parts of the wheeled jack.

The main frame 18 supports at 36 a pin 37 on which is pivotally carried a dog 38. Pivoted to the dog 38 through pin 39 is a rod 40 which extends upwardly within the tubular handle 14. The upper end of the rod 40 is equipped with a roller 41 whereby to facilitate the movement of the rod 40 within the handle, and to guide the rod 40 within the handle. The roller 41 is supported through a pin 42 on the end of the rod, and carried by this same pin 42 is a spring guiding bar 43 supporting a washer 44.

Surrounding the bar 43 and pressing against the washer 44 is a coil spring 45, the opposite end of which presses against a pin 46 fixed to the handle 14. It will be readily appreciated that it is the function of the spring 45 to maintain the handle or lifting lever 14 in its vertical position of Fig. 3 through pressure exerted against the rod 40 and the dog 38 at one end, and against pin 46 at the other end.

Cooperating with both the dog 38 and the handle 14, through the lifting member 15, is a holding hook 47. In the normal position of the parts prior to lifting by the jack, the holding hook 47 is maintained in its position of Fig. 3 by the dog 38 through pressure against the leg 48 of the holding hook 47. In this position of the holding hook 47, its holding slot 49 engages a lug 50 on the lifting member 15. It will be obvious that through coaction of the parts 49 and 50, the upward swinging of the handle 14 through the action of the spring 45 will be limited to the position shown in Fig. 3. It will be further appreciated that the spring 45 will simultaneously apply pressure through the dog 38 to the main frame 18, tending to swing the main frame in the opposite direction, or clockwise, thereby tending to swing clockwise the several links 25 and 27 and the lifting frame 19. This is best appreciated by viewing Figs. 2 and 3, in which figures the relationship of the links 25 and 27 to the main frame in the non-elevated position of the jack is shown.

The relation of the slot 49 of the holding hook 47 and lug 50 on the lifting member 15 is such that with the parts in their non-lifting position of Fig. 3, the lifting member 15 is held in spaced relation to links 27, allowing for the free space 31 between lugs 30 and links 27 previously referred to.

As will be described presently, when a load is assumed by the main and lifting frames, through the downward swinging movement of the handle 14, it is possible for the lifting member 15 to move relatively to the then held main frame and links 27 to bring the lugs 30 against the links 27, eliminating the space 31. During this movement, the lifting member 15 is released relatively to the holding hook 47, and remains released until the load is once again assumed by the lifting member 15 when it is desired to release the locking pawl and to lower the load, all as will be described presently.

At this point, it will be well to indicate that a leg 51 is welded at 52 to front links 25, and is adapted to support the wheeled jack when it is not in action, all as is best shown in Fig. 2. Since I have now described the various parts which make up my wheeled jack, I shall review a complete lifting and lowering operation of the jack, which I believe will clarify the operation of the various parts. In this description, I shall refer to additional parts not already particularly described.

As has already been indicated, the jack is normally allowed to rest in the position of Fig. 2 through the utilization of leg 51. Because of the angular camming groove 20 formed on the lifting frame 19 of the jack, the socket 21 of the lifting frame is readily moved into engagement with the pin 22 depending from the front end of the semi-live skid 10, as will be readily appreciated. This position of the parts is best shown in Fig. 3, in which it is seen that the load has not yet been assumed by the lifting frame 19.

As the handle 14 and its associated lifting lever 15 are swung downwardly from the position of Fig. 3 to the position of Fig. 4, it will be appreciated that the load is first assumed by the lifting frame 19, and that thereafter, the continued movement of the handle 14 will first compress the spring 45 and take up the space 31 between the lugs 30 on the lifting member 15 and the links 27. This also releases the lifting member from the holding hook 47. The hook 47 remains, however, under the control of the dog 38. Further downward swinging movement of the lifting member 15 to the position of Fig. 4, will cause the links 25 and 27 to swing the lifting frame 19 to its elevated position of Fig. 4, in which position the locking pawl 32 drops by gravity into locking position, with its detent portion 34 against lug 35 of the main frame 18, and maintains the lifting frame elevated relatively to the main frame.

It will be best to indicate at this time that due to the particular connection between the pin 22 and the socket 21 of the lifting frame 19, the said lifting frame 19 is incapable of any substantial rocking movement, and moves substantially in a vertical direction only during the lifting operation. Through the parallelogram linkage formed by links 25 and 27 with the main and lifting frames, the main frame 18 is similarly guided and controlled so as to be incapable of any substantial movement other than vertically. Naturally, the main frame is held against vertical movement so that all vertical movement is imparted to the lifting frame 19. This relationship of the parts 18 and 19 when considered in the light that the main frame 18 is supported only on the axle 16, is of importance in a proper appreciation of my invention.

It will be noted that in Fig. 4, the leg 48 of the holding hook 47 is still maintained under the control of dog 38. Should the lifting lever or handle 14 be swung downwardly beyond the position of Fig. 4 during the same lifting operation which elevated the lifting frame, the locking pawl 32 will naturally move with its supporting shaft 23 and the lifting frame 19, and will bear against the upstanding lug 54 formed on the main frame 18. This will naturally move the locking pawl 32 away from its locking position relatively to the lug 35 on the main frame 18. However, there will be nothing to maintain it in this position when the handle 14 and lifting member 15 are brought back to the position of Fig. 4, and the locking pawl 32 will once again drop into locking position.

Because of this construction, it is impossible to raise the platform on an initial swinging movement of the lever 14 so as to first lock the load in elevated position and then release it in the same continuous movement. Thus, I make it necessary, once the load is lifted, to bring the lifting handle 14 to a position approximating that of Fig. 5, in which position the locking pawl 32 becomes predisposed for releasing to allow for the lowering of the load, all as will be described below.

Referring now to Fig. 5, it will be noted that the lifting member 15 and the lifting handle 14 have been elevated through action of the spring 45, or possibly manually. This movement of the lifting member 15 from the position of Fig. 4 has caused a pin 55, fixed to the lifting member 15, to engage the surface 56 of the holding hook 47 and move that holding hook to its full line position of Fig. 5 against the pressure of the dog 38. Once the holding hook 47 has been released from the control of the dog 38, it is capable of moving further, and into its dotted line position as the lifting member 15 moves downwardly from the position of Fig. 5, as in the case wherein it is desired to pull the now completely live skid platform to a new location. The surface 32a on locking pawl 32 limits clockwise rotation of the holding hook 47, as shown in dotted lines in Fig. 5.

The locking pawl 32, through the displacing of the holding hook 47 from the position of Fig. 4 to the position of Fig. 5, has now become predisposed for maintenance out of holding position. This will best be indicated through reference to Fig. 6, where the lifting lever 14 and the lifting member 15 have been swung downwardly to elevate the lifting frame 19 beyond its normal elevated position of Fig. 4. The surface 53 of locking pawl 32 has, in this position, contacted the upstanding lug portion 54 formed on the main frame 18 and its detent portion 34 has therefore been moved out of holding relation to the lug 35 on the main frame. The holding hook 47 having been released from the spring pressed dog 38, as was indicated with regard to Fig. 5, is free to fall by gravity into its position of Fig. 6, with its leg 57 against the surface 58 of the locking pawl 32.

Simultaneously, the slot 49 of the holding hook 47 falls against the lug 50 of the lifting member 15. With the parts in this position, upward movement of the lifting lever 14 and the lifting member 15 allows for a lowering of the lifting frame 19, since the locking pawl 32 is now held by hook 47 against dropping into its locking position of Fig. 5. The locking pawl 32 is therefore carried back to its initial position of Fig. 3. At the same time, the holding hook 47 is moved by the lifting member 15 to its position of Fig. 3, bringing its leg 48 against the spring pressed dog 38, so as to be held thereafter by the dog 38 through pressure of spring 45. The parts are now in their initial position ready for the same complete lifting and lowering action as has just been described.

Of course, it should be reiterated that with the parts in the position of Fig. 3, spring 45 functions once again to maintain the lug 30 and lifting member 15 spaced by space 31 from the links 27, and with the remainder of the parts in their normal operative relationship. The wheeled jack may now be separated from the depending pin 22 of the semi-live skid 10, all as will be fully appreciated.

I now claim:

1. In a combination of the class described, a wheel supported axle, a main frame pivotally supported on said axle, a lifting frame, lifting links connecting corresponding portions of said main and lifting frames, means on said lifting frame adapted to engage a portion of a device to be elevated, whereby said lifting frame is held by said portion of the device to be lifted against substantial rocking, said lifting frame through said links maintaining said main frame against substantial rocking on its wheel supported axle.

2. In a combination of the class described, a main frame, wheels supporting said main frame, a lifting frame, a lifting lever for moving said lifting frame relatively to said main frame to elevate a load assumed by said lifting frame, a locking pawl for locking said lifting frame against lowering movement relatively to said main frame once said lifting frame has been raised to a predetermined position, means for moving said locking pawl out of locking position, and means whereby raising of said lifting lever to a predetermined point after elevating the lifting frame to said predetermined position, is a prerequisite to the holding of said locking pawl out of locking position as required for lowering said lifting frame.

3. In a combination of the class described, a main frame, wheels supporting said main frame, a lifting frame, a lifting lever for moving said lifting frame relatively to said main frame to elevate a load assumed by said lifting frame, a locking pawl for locking said lifting frame against lowering movement relatively to said main frame once said lifting frame has been raised to a predetermined position, means whereby the lifting of said lifting frame by said lifting lever beyond said predetermined lifted position automatically moves said locking pawl out of locking position as required for lowering said lifting frame, and holding means movable automatically into position for holding said pawl out of locking position thereafter.

4. In a combination of the class described, a main frame, wheels supporting said main frame, a lifting frame, a lifting lever for moving said lifting frame relatively to said main frame to elevate a load assumed by said lifting frame, a locking pawl for locking said lifting frame against lowering movement relatively to said main frame once said lifting frame has been raised to a predetermined position, means for thereafter moving said locking pawl from locking position when said lifting frame is lifted beyond said predetermined position, a holding member for holding said locking pawl out of locking position when so released, and means maintaining said holding member against movement to holding position until said lifting lever is raised a predetermined amount after said lifting frame has been moved to said predetermined elevated position.

5. In a combination of the class described, a main frame, wheels supporting said main frame, a lifting frame, means mounting said lifting frame for lifting movement relatively to said main frame, a lifting lever for raising said lifting frame relatively to said main frame, a locking device for locking said lifting frame against lowering movement once said lifting frame has been raised to a predetermined position, holding means for said locking device released by raising of said lifting lever to a predetermined point after elevating the lifting frame to said predetermined position, means whereby said locking device is moved automatically out of locking position by the lifting of said lifting frame beyond said predetermined position, said holding means then moving into position to hold said locking device out of locking position as the lifting frame is lowered.

6. In a combination of the class described, a main frame, a wheel supported axle on which said frame is pivotally supported, a lifting frame, front and rear lifting links connecting corresponding portions of said main and lifting frames, said lifting frame having means for engagement with a device to be lifted whereby said lifting frame is maintained against substantial rocking during said lifting movement, a lifting lever for raising said lifting frame relatively to said main frame through a pivotal swinging of said links relatively to said main frame, a locking pawl for locking said lifting frame against lowering movement once said lifting frame has been raised to a predetermined position, and means whereby raising of said lifting lever to a predetermined point after elevating the lifting frame to said predetermined position, followed by the lifting of said lifting frame by said lifting beyond said predetermined lifted position is a prerequisite to the releasing of said locking pawl required for lowering of said lifting frame.

7. In a combination of the class described, a main frame, a wheel supported axle on which said frame is pivotally supported, a lifting frame, front and rear lifting links connecting corresponding portions of said main and lifting frames, said lifting frame having means for engagement with a device to be lifted whereby said lifting frame is maintained against substantial rocking during said lifting movement, a lifting lever for raising said lifting frame relatively to said main frame through a pivotal swinging of said links relatively to said main frame, a locking pawl for locking said lifting frame against lowering movement once said lifting frame has been raised to a predetermined position, means for thereafter moving said locking pawl from locking position when said lifting frame is lifted beyond said predetermined position, a holding member for holding said locking pawl out of locking position when so released, and means maintaining said holding member against movement to holding position until said lifting lever is raised a predetermined amount after said lifting frame has been moved to said predetermined elevated position.

8. In a combination of the class described, a wheel supported axle, a main frame pivotally supported on said axle, a lifting frame, front and rear lifting links connecting corresponding ends of said main and lifting frames, said lifting frame having means for engagement with a device to be lifted whereby said lifting frame is maintained against substantial rocking during said lifting movement, a lifting lever for raising said lifting frame relatively to said main frame through a pivotal swinging of said links relatively to said main frame, a locking pawl for locking said lifting frame against lowering movement once said lifting frame has been raised to a predetermined position, and means whereby lifting of said lifting frame by said lifting lever beyond said predetermined lifted position is a prerequisite to the release of said locking pawl to allow lowering of said lifting frame.

9. In a combination of the class described, a main frame, a wheel supported axle on which said frame is pivotally supported, a lifting frame, lifting links connecting corresponding ends of said main and lifting frames, said lifting frame having means to engage a portion of a device to be elevated, said portion maintaining said lifting frame fixed against substantial rocking and thereby through said links maintaining said main frame against substantial rocking on its wheel supported axle, a lifting lever for raising said lifting frame relatively to said main frame through a pivotal swinging of said links relatively to said main frame, a locking pawl for locking said lifting frame against lowering movement once said lifting frame has been raised to a predetermined lifted position, and means whereby lifting of said lifting frame beyond said predetermined lifted position is a prerequisite to the release of said locking pawl to allow lowering of said lifting frame.

10. In a combination of the class described, a main frame, a wheel supported axle on which said frame is pivotally supported, a lifting frame, lifting links connecting corresponding ends of said main and lifting frames, a lifting lever for raising said lifting frame relatively to said main frame through a pivotal swinging of said links relatively to said main frame, a locking pawl for locking said lifting frame against lowering movement once said lifting frame has been raised to a predetermined lifted position, and means whereby lifting of said lifting frame beyond said predetermined lifted position moves said holding pawl out of holding position and maintains said pawl out of holding position until said lifting frame is lowered below said predetermined lifted position.

11. In a combination of the class described, a main frame, a wheel supported axle on which said frame is supported, a lifting frame supported for elevating movement relatively to said main frame, a lifting lever for raising said lifting frame relatively to said main frame, a locking pawl for locking said lifting frame against lowering movement once said lifting frame has been raised to a predetermined lifted position, a holding device for holding said locking pawl out of locking position, means for maintaining said holding device out of movement to holding position, said means releasing said holding device for said movement when said lifting lever is raised to a predetermined point following the elevation of the lifting frame to its predetermined elevated position, and means whereby lifting of said lifting frame beyond predetermined lifted position moves said locking pawl out of locking position and into position to be maintained by said holding device out of locking position until said lifting frame is lowered below said predetermined lifted position.

12. In a combination of the class described, a main frame, a wheel supported axle on which said frame is supported, a lifting frame, lifting links connecting corresponding ends of said main and lifting frames, a lifting lever for raising said lifting frame relatively to said main frame through a pivotal swinging of said links relatively to said main frame, a locking pawl for locking said lifting frame against lowering movement once said lifting frame has been raised to a predetermined lifted position, a holding device for holding said locking pawl out of locking position, means for maintaining said holding device out of movement to holding position, said means releasing said holding device for said movement when said lifting lever is raised to a predetermined point following the elevation of the lifting frame to its predetermined elevated position, and means whereby lifting of said lifting frame beyond said predetermined lifted position moves said locking pawl out of locking position and into position to be maintained by said holding device out of locking position until said lifting frame is lowered below said predetermined lifted position.

13. In a combination of the class described, a main frame, a wheel supported axle on which said frame is pivotally supported, a lifting frame, lifting links connecting corresponding ends of said main and lifting frames, a lifting lever for raising said lifting frame relatively to said main frame through a pivotal swinging of said links relatively to said main frame, a spring between one of said frames and said lifting lever, tending to swing said lever in one direction while swinging said frame in the opposite direction, and means for limiting said opposite swinging whereby to maintain said frames and lever in a predetermined assembled relation.

14. In a combination of the class described, a main frame, a wheel supported axle on which said frame is pivotally supported, a lifting frame, lifting links connecting corresponding ends of said main and lifting frames, said lifting frame having means to engage a portion of a device to be elevated, said portion maintaining said lifting frame fixed against substantial rocking and thereby through said links maintaining said main frame against substantial rocking on its wheel supported axle, a tubular lifting lever for raising said lifting frame relatively to said main frame through a pivotal swinging of said links relatively to said main frame, a spring in said tubular lever and means whereby said spring is functionally operative between one of said frames and said lifting lever to swing said lever in one direction while swinging said frame in the opposite direction, and means for limiting said opposite swinging whereby to maintain said frames and lever in a predetermined assembled relation.

15. In a combination of the class described, a main frame, a wheel supported axle on which said frame is pivotally supported, a lifting frame, lifting links connected corresponding ends of said main and lifting frames, a lifting lever for raising said lifting frame relatively to said main frame through a pivotal swinging of said links relatively to said main frame, a spring functionally operative between said lifting lever and said main frame to swing said lever and main frame in opposite directions relatively to one another, a holding hook for limiting said swinging in opposite directions, a dog also actuated by said spring, and means whereby said dog maintains said holding hook in limiting position.

16. In a combination of the class described, a main frame, a wheel supported axle on which said frame is pivotally supported, a lifting frame, lifting links connecting corresponding ends of said main and lifting frames, a lifting lever for raising said lifting frame relatively to said main frame through a pivotal swinging of said links relatively to said main frame, a spring functionally operative between said lifting lever and said main frame to swing said lever and main frame in opposite directions relatively to one another, a holding hook for limiting said swinging in opposite directions while allowing a slight separation between said lever and the means actuated by downward swinging lifting movement of said lifting lever, the initial application of force to said lifting lever when said lifting frame is against a device to be lifted compressing said spring and releasing the said lifting lever from said holding hook.

17. In a combination of the class described, a main frame, a wheel supported axle on which said frame is pivotally supported, a lifting frame, lifting links connecting corresponding ends of said main and lifting frames, said lifting frame having means to engage a portion of a device to be elevated, said portion maintaining said lifting frame fixed against substantial rocking and thereby through said links maintaining said main frame against substantial rocking on its wheel supported axle, a lifting lever for raising said lifting frame relatively to said main frame through a pivotal swinging of said links relatively to said main frame, a spring between said lever and said main frame tending to swing said lever and main frame in opposite directions, and a holding hook for limiting said swinging in opposite directions.

18. In a combination of the class described, a single wheel supported axle, a main frame pivoted on said single axle, links pivoted at their lower ends to said main frame at spaced points, a lifting frame pivotally supported relatively to said main frame on the upper ends of said links and elevated through swinging of the links relatively to said main frame, said lifting frame having means for engagement with a device to be lifted whereby said lifting frame is maintained by said device against substantial rocking, a lifting lever, and means whereby downward swinging of said lifting lever swings the said links to elevate said lifting frame.

19. In a combination of the class described, a single wheel supported axle, a main frame pivoted on said single axle, links pivoted to said main frame at spaced points, a lifting frame pivotally supported relatively to said main frame on the upper ends of said links and elevated through swinging of the links relatively to said main frame, said lifting frame having means for engaging a semi-live skid to be lifted, said means forming a pin and sleeve connection through which said lifting frame is maintained against substantial rocking, a lifting lever, means whereby downward swinging of said lifting lever swings the said links to elevate said lifting frame, and a locking pawl on one of said frames for locking said lifting frame relatively to said main frame and in elevated position.

20. In a combination of the class described, a wheel supported axle, a main frame pivoted on said axle, links pivoted to said main frame at spaced points, a lifting frame supported by said links and elevated through swinging of the links relatively to said main frame, said lifting frame having means for engagement with a device to be lifted whereby said lifting frame is maintained against substantial rocking during said lifting movement, a lifting lever, means whereby downward swinging of said lifting lever swings the said links to elevate said lifting frame, a locking pawl on one of said frames for locking said lifting frame relatively to said main frame and in elevated position, means for moving said locking pawl out of locking position when said lifting frame is elevated slightly beyond its normal elevated position, and a holding hook for holding said pawl out of its locking position until said lifting frame is lowered to a position below said normal elevated position.

21. In a combination of the class described, a wheel supported axle, a main frame pivoted on said axle, links pivoted to said main frame at spaced points, a lifting frame supported by said links and elevated through swinging of the links relatively to said main frame, said lifting frame having means for engagement with a device to be lifted whereby said lifting frame is maintained against substantial rocking during said lifting movement, a lifting lever, means whereby downward swinging of said lifting lever swings the said links to elevate said lifting frame, a locking pawl on one of said frames for locking said lifting frame relatively to said main frame and in elevated position, means for moving said locking pawl out of locking position when said lifting frame is elevated slightly beyond its normal elevated position, a holding hook for holding said pawl out of its locking position movable into holding position as said lifting frame is lifted by said lifting lever slightly beyond its normal elevated position, a spring between said main frame and said lifting lever tending to swing said lifting lever upwardly relatively to said main frame, and means on said holding hook for limiting said upward swinging movement, and moving into engagement with said lifting lever as said holding hook moves into holding relation to said locking pawl.

22. In a combination of the class described, a wheel supported axle, a main frame pivoted on said axle, links pivoted to said main frame at spaced points, a lifting frame supported by said links and elevated through swinging of said links relatively to said main frame, said lifting frame having means for engagement with a device to be lifted whereby said lifting frame is maintained against substantial rocking during said lifting movement, a lifting lever, means whereby downward swinging of said lifting lever swings the said links to elevate said lifting frame, a locking pawl carried by said lifting frame for locking said lifting frame relatively to said main frame and in elevated position, means for moving said locking pawl out of locking position when said lifting frame is elevated slightly beyond its normal elevated position, a holding hook for holding said pawl out of its locking position movable into holding position as said lifting frame is lifted by said lifting lever slightly beyond its normal elevated position, a spring between said main frame and said lifting lever tending to swing said lifting lever upwardly relatively to said main frame, means on said holding hook for limiting said upward swinging movement, said holding hook moving into engagement with said lifting lever as it moves into holding relation to said locking pawl, said holding hook allowing a slight separation between said lifting lever and said swinging link when said lifting frame is not in contact with a load, the downward swinging of said lifting lever when said lifting frame is in contact with a load acting to release said lifting lever from said holding hook as said lifting lever moves to eliminate said slight separation.

23. In a combination of the class described, a main frame, a wheel supported axle on which said frame is pivotally supported, a lifting frame, lifting links connecting corresponding ends of said main and lifting frames, a lifting lever for raising said lifting frame relatively to said main frame through a pivotal swinging of said links relatively to said main frame, a locking pawl for locking said lifting frame in a normal elevated position when it is elevated to said position, a spring functionally operative between said lifting lever and said main frame to swing said main frame and lifting lever in opposite directions relatively to one another, a holding hook for limiting said swinging in opposite directions, the downward swinging of said lifting lever when said lifting frame is in contact with the device to be lifted acting to compress said spring, a dog actuated by said spring and adapted to dog said holding hook against movement out of a predetermined zone, means whereby said lifting lever moves said holding hook out of control of said dog as said lever moves upwardly after elevating said lifting frame, means whereby elevation of said lifting frame thereafter beyond its normal elevated position moves said locking pawl out of locking position whereupon said holding hook drops into position to hold said pawl out of locking position to allow lowering of the lifting frame, said holding hook being movable by said lifting lever back under the control of said dog and into limiting position as said lifting frame is lowered under the control of the lifting lever.

24. In a combination of the class described, a main frame, wheels supporting said main frame, a lifting frame, means mounting said lifting frame for lifting relatively to said main frame, a lifting lever for raising said lifting frame relatively to said main frame a locking device for locking said lifting frame against lowering movement once said lifting frame has been raised to a predetermined lifted position, and means automatically moving said locking device out of locking position as said lifting frame moves beyond said predetermined position.

25. In a combination of the class described, a main frame, wheels supporting said frame, a lifting frame mounted for lifting movement relatively to said main frame, a tubular lifting lever for raising said lifting frame relatively to said main frame, a spring within said tubular lever and pressing functionally against a rod pivotally connected to said main frame whereby to swing said main frame and said lifting lever in opposite directions, and a roller on the end of said rod for guiding the said rod within said tubular lifting lever.

26. In a combination of the class described, a main frame, wheels supporting said main frame, a lifting frame, means mounting said lifting frame for lifting relatively to said main frame, a lifting lever for raising said lifting frame relatively to said main frame, a locking device for locking said lifting frame against lowering movement once said lifting frame has been raised to a predetermined lifted position, means automatically moving said locking device out of locking position as said lifting frame moves beyond said predetermined position, and means for thereafter automatically holding said locking device out of locking position to allow lowering of said lifting frame.

27. In a combination of the class described, a main frame, a sin... e on which said main frame is pivotally supported, ground engaging means supporting said axle, a lifting frame, cooperating lifting means engaging corresponding portions of said main and lifting frames, said lifting frame having engaging means to engage a portion of a device to be elevated, said portion through said engaging means maintaining said lifting frame fixed against substantial rocking and thereby through said lifting means maintaining said main frame against substantial rocking on said single axle, and means for raising said lifting frame relatively to said main frame through said cooperating lifting means.

28. In a combination of the class described, a main frame, a wheel supported axle on which said frame is pivotally supported, a lifting frame, lifting links connecting corresponding ends of said main and lifting frames, said lifting frame having means to engage a portion of a device to be elevated, said portion through said means maintaining said lifting frame fixed against substantial rocking and thereby through said links maintaining said main frame against rocking on its wheel supported axle, a lifting lever for raising said lifting frame relatively to said main frame through a pivotal swinging of said links relatively to said main frame, a locking pawl for locking said lifting frame against lowering movement once said lifting frame has been raised to a predetermined lifted position, and means for moving said locking pawl out of locking position upon lifting of said lifting frame by said lever beyond said predetermined position, and for thereafter holding it out of locking position until the lifting frame is lowered.

GEORGE QUAYLE.